United States Patent
Koseoglu et al.

(10) Patent No.: US 10,207,196 B2
(45) Date of Patent: Feb. 19, 2019

(54) CRACKING SYSTEM INTEGRATING HYDROCRACKING AND FLUIDIZED CATALYTIC CRACKING

(71) Applicant: Saudi Arabian Oil Company, Dhahran (SA)

(72) Inventors: Omer Refa Koseoglu, Dhahran (SA); Musaed Muhammad Al-Thubaiti, Dhahran (SA); Ali Mahmood Al-Somali, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 902 days.

(21) Appl. No.: 14/011,367

(22) Filed: Aug. 27, 2013

(65) Prior Publication Data
US 2013/0343957 A1    Dec. 26, 2013

Related U.S. Application Data

(62) Division of application No. 13/069,498, filed on Mar. 23, 2011, now Pat. No. 9,101,854.

(51) Int. Cl.
*B01J 8/26* (2006.01)
*C10G 11/18* (2006.01)
(Continued)

(52) U.S. Cl.
CPC ............ *B01D 3/009* (2013.01); *B01J 8/26* (2013.01); *C10G 11/18* (2013.01); *C10G 65/12* (2013.01);
(Continued)

(58) Field of Classification Search
CPC .. B01J 2208/00991; B01J 8/18; B01J 8/1872; B01J 8/24; B01J 8/245; B01J 8/26;
(Continued)

(56) References Cited

U.S. PATENT DOCUMENTS

| 3,072,560 A | 1/1963 | Paterson et al. |
| 3,074,878 A | 1/1963 | Pappas et al. |

(Continued)

FOREIGN PATENT DOCUMENTS

| CN | 1493667 A | 5/2004 |
| CN | 1493668 A | 5/2004 |
| CN | 1766054 A | 5/2006 |

OTHER PUBLICATIONS

Chinese Appliction for Invention No. 201280014519.4, Office Action, dated Sep. 2, 2014, 21 pages (including English Translation).
(Continued)

*Primary Examiner* — Huy Tram Nguyen
(74) *Attorney, Agent, or Firm* — Abelman, Frayne & Schwab

(57) ABSTRACT

A system and method of cracking hydrocarbon feedstocks is provided that allows for significant flexibility in terms of the desired product yield. An integrated process includes introducing the feedstock and hydrogen into a first hydrocracking reaction zone containing a first hydrocracking catalyst to produce a first zone effluent. The first zone effluent and optionally additional hydrogen are passed to a second hydrocracking reaction zone containing a second hydrocracking catalyst to produce a second zone effluent. The second zone effluent is conveyed to a fractionating zone to at least a low boiling fraction and a high boiling fraction, and optionally one or more intermediate fractions. The bottoms fraction is passed to a fluidized catalytic cracking reaction and separation zone, from which olefins and gasoline are recovered. At least a portion of remaining cycle oil is passed from the fluidized catalytic cracking reaction and separation zone to the first and/or second hydrocracking reaction zone.

6 Claims, 2 Drawing Sheets

(51) Int. Cl.
*B01J 8/18* (2006.01)
*B01J 8/24* (2006.01)
*B01D 3/00* (2006.01)
*C10G 69/04* (2006.01)
*C10G 65/12* (2006.01)
*B01J 29/08* (2006.01)
*B01J 29/40* (2006.01)
*B01J 29/80* (2006.01)

(52) U.S. Cl.
CPC ............. *C10G 69/04* (2013.01); *B01J 29/084* (2013.01); *B01J 29/40* (2013.01); *B01J 29/80* (2013.01); *C10G 2300/1059* (2013.01); *C10G 2300/301* (2013.01); *C10G 2400/02* (2013.01); *C10G 2400/20* (2013.01)

(58) Field of Classification Search
CPC ........ B01D 3/009; C10G 11/18; C01G 65/12; C01G 69/04
USPC .................................................. 422/110, 142
See application file for complete search history.

(56) References Cited

U.S. PATENT DOCUMENTS

| | | | |
|---|---|---|---|
| 3,175,968 A * | 3/1965 | Berger | B01J 19/0033 196/132 |
| 3,185,639 A | 5/1965 | Paterson et al. | |
| 3,193,488 A | 7/1965 | Carr et al. | |
| 3,349,023 A | 10/1967 | Paterson et al. | |
| 3,380,912 A | 4/1968 | Paterson et al. | |
| 3,415,720 A * | 12/1968 | Rijnsdorp | B01D 3/425 196/141 |
| 3,619,407 A | 11/1971 | Hendricks et al. | |
| 3,759,820 A | 9/1973 | Boyd | |
| 3,972,804 A * | 8/1976 | McLaughlin | C10G 49/26 208/108 |
| 3,983,029 A | 9/1976 | White | |
| 4,419,221 A | 12/1983 | Castagnos, Jr. et al. | |
| 4,426,276 A | 1/1984 | Dean et al. | |
| 4,661,238 A | 4/1987 | Humbach et al. | |
| 4,713,167 A | 12/1987 | Reno et al. | |
| 4,789,457 A | 12/1988 | Fischer et al. | |
| 4,842,714 A | 6/1989 | Pellet et al. | |
| 4,980,053 A | 12/1990 | Li et al. | |
| 4,985,134 A | 1/1991 | Derr et al. | |
| 4,990,239 A | 2/1991 | Derr, Jr. et al. | |
| 5,009,768 A | 4/1991 | Galiasso et al. | |
| 5,326,465 A | 7/1994 | Yongqing et al. | |
| 5,382,349 A | 1/1995 | Yoshita et al. | |
| 5,462,652 A | 10/1995 | Wegerer | |
| 5,464,526 A | 11/1995 | Saunders | |
| 5,904,835 A | 5/1999 | Thakkar | |
| 5,944,982 A | 8/1999 | Lomas | |
| 5,951,850 A | 9/1999 | Ino et al. | |
| 6,113,775 A | 9/2000 | Christolini et al. | |
| 6,123,830 A | 9/2000 | Gupta et al. | |
| 6,179,995 B1 | 1/2001 | Cash et al. | |
| 6,207,041 B1 * | 3/2001 | Morel | C10G 65/04 208/210 |
| 6,224,748 B1 | 5/2001 | Chang et al. | |
| 6,538,169 B1 | 3/2003 | Pittman et al. | |
| 6,620,311 B2 * | 9/2003 | Morel | C10G 65/04 208/100 |
| 6,656,346 B2 | 12/2003 | Ino et al. | |
| 6,783,660 B2 | 8/2004 | Dahlberg et al. | |
| 6,811,682 B2 | 11/2004 | Stuntz et al. | |
| 6,837,989 B2 | 1/2005 | Stuntz et al. | |
| 7,074,321 B1 | 7/2006 | Kalnes | |
| 7,312,370 B2 | 12/2007 | Pittman et al. | |
| 2002/0195373 A1 | 12/2002 | Ino et al. | |
| 2003/0006168 A1 | 1/2003 | Ino et al. | |
| 2004/0112793 A1 | 6/2004 | Dath et al. | |
| 2004/0206669 A1 | 10/2004 | De Rezende Pinho et al. | |
| 2006/0108260 A1 | 5/2006 | Henry | |
| 2006/0289338 A1 | 12/2006 | Gueret et al. | |
| 2007/0205139 A1 | 9/2007 | Kulprathiapanja et al. | |
| 2008/0128325 A1 | 6/2008 | Khan et al. | |
| 2011/0073523 A1 | 3/2011 | Cui et al. | |

OTHER PUBLICATIONS

EPO Application No. 12760594.7, Supplementary European Search Report and Opinion, dated Oct. 17, 2014, 13 pages.
PCT/US2012/028507, International Search Report and Written Opinion, dated Jun. 15 2012, 13 pages.

* cited by examiner

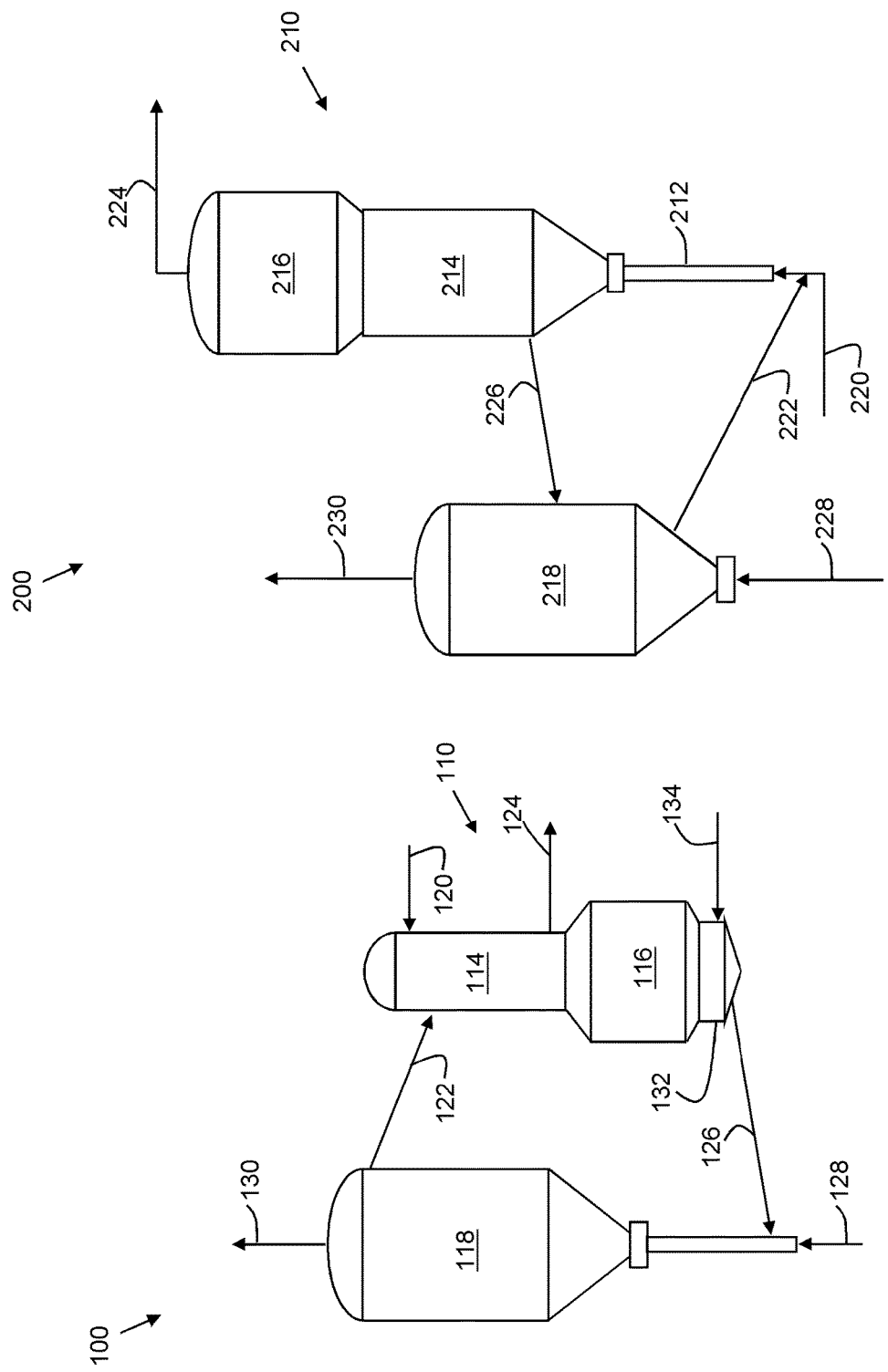

CRACKING SYSTEM INTEGRATING HYDROCRACKING AND FLUIDIZED CATALYTIC CRACKING

RELATED APPLICATIONS

The present application is a divisional application under 35 USC § 120 of U.S. application Ser. No. 13/069,498 filed on Mar. 23, 2011, which is presently pending and is incorporated by reference in its entirety in the present application.

BACKGROUND OF THE INVENTION

Field of the Invention

The present invention relates to integrated cracking systems and processes that combine hydrocracking and fluidized catalytic cracking operations, in particular for enhanced flexibility in the production of light olefinic and middle distillate products.

Description of Related Art

Hydrocracking processes are used commercially in a large number of petroleum refineries. They are used to process a variety of feeds boiling in the range of 370° C. to 520° C. in conventional hydrocracking units and boiling at 520° C. and above in the residue hydrocracking units. In general, hydrocracking processes split the molecules of the feed into smaller, i.e., lighter, molecules having higher average volatility and economic value. Additionally, hydrocracking processes typically improve the quality of the hydrocarbon feedstock by increasing the hydrogen to carbon ratio and by removing organosulfur and organonitrogen compounds. The significant economic benefit derived from hydrocracking operations has resulted in substantial development of process improvements and more active catalysts.

Mild hydrocracking or single stage once-through hydrocracking occurs at operating conditions that are more severe than hydrotreating processes, and less severe than conventional full pressure hydrocracking processes. This hydrocracking process is more cost effective, but typically results in lower product yields and quality. The mild hydrocracking process produces less mid-distillate products of a relatively lower quality as compared to conventional hydrocracking. Single or multiple catalysts systems can be used depending upon the feedstock processed and product specifications. Single stage hydrocracking is the simplest of the various configurations, and is typically designed to maximize mid-distillate yield over a single or dual catalyst systems. Dual catalyst systems can be deployed as a stacked-bed configuration or in multiple reactors.

In a series-flow configuration the entire hydrotreated/hydrocracked product stream from the first reactor, including light gases (e.g., $C_1$-$C_4$, $H_2S$, $NH_3$) and all remaining hydrocarbons, are sent to the second reactor. In two-stage configurations the feedstock is refined by passing it over a hydrotreating catalyst bed in the first reactor. The effluents are passed to a fractionator column to separate the light gases, naphtha and diesel products boiling in the temperature range of 36° C. to 370° C. The hydrocarbons boiling above 370° C. are then passed to the second reactor for additional cracking.

In fluidized catalytic cracking (FCC) processes, petroleum derived hydrocarbons are catalytically cracked with an acidic catalyst maintained in a fluidized state, which is regenerated on a continuous basis. The main product from such processes has generally been gasoline. Other products are also produced in smaller quantities via FCC processes such as liquid petroleum gas and cracked gas oil. Coke deposited on the catalyst is burned off at high temperatures and in the presence of air prior to recycling regenerated catalyst back to the reaction zone.

In recent years there has been a tendency to produce, in addition to gasoline, light olefins by FCC operations, which are valuable raw materials for various chemical processes. These operations have significant economic advantages, particularly with respect to oil refineries that are highly integrated with petrochemical production facilities.

There are different methods to produce light olefins by FCC operations. Certain FCC operations are based on a short contact time of the feedstock with the catalyst, e.g., as disclosed in U.S. Pat. Nos. 4,419,221, 3,074,878, and 5,462,652, which are incorporated by reference herein. However, the short contact time between feedstock and catalyst typically results in relatively low feed conversion.

Other FCC operations are based on using pentasil-type zeolite, for instance, as disclosed in U.S. Pat. No. 5,326,465, which is incorporated by reference herein. However, the use of a pentasil-type zeolite catalyst will only enhance the yield of light fraction hydrocarbons by excessive cracking of the gasoline fraction, which is also a high value product.

Additional FCC processes are based on carrying out the cracking reactions at high temperature, such as that disclosed in U.S. Pat. No. 4,980,053, which is incorporated by reference herein. However, this method can result in relatively high levels of dry gases production.

Further FCC operations are based on cracking the feed oil at high temperature and short contact time and using a catalyst mixture of specific base cracking catalyst and an additive containing a shape-selective zeolite, as disclosed in U.S. Pat. No. 6,656,346, which is incorporated by reference herein. Processes based on this method are also known as High Severity Fluidized Catalytic Cracking (HS-FCC). Features of this process include a downflow reactor, high reaction temperature, short contact time, and high catalyst to oil ratio.

Downflow reactors permit higher catalyst to oil ratio, since lifting of solid catalyst particles by vaporized feed is not required, and this is particularly suitable for HS-FCC. In addition, HS-FCC processes are operated under considerably higher reaction temperatures (550° C. to 650° C.) as compared to conventional FCC processes. Under these reaction temperatures, two competing cracking reactions occur, thermal cracking and catalytic cracking. Thermal cracking contributes to the formation of lighter products, such as dry gas and coke, whereas catalytic cracking increases propylene and butylene yield. The short residence time in the downflow reactor is also favorable to minimize thermal cracking. Undesirable secondary reactions such as hydrogen-transfer reactions, which consume olefins, are suppressed. The desired short residence time is attained by mixing and dispersing catalyst particles and feed at the reactor inlet followed by immediate separation at the reactor outlet. In order to compensate for the decrease in conversion due to the short contact time, the HS-FCC process is operated at relatively high catalysts to oil ratio.

While individual and discrete hydrocracking and FCC processes are well developed and suitable for their intended purposes, there nonetheless remains a need for increased flexibility, efficiency and high-value product yield in refinery operations.

SUMMARY OF THE INVENTION

In accordance with one or more embodiments, the invention relates to a system and method of cracking hydrocarbon feedstocks in a manner that allows for significant flexibility in terms of the desired product yield.

In accordance with one or more embodiments, an integrated process for conversion of a feedstock is provided, in particular for feedstocks containing hydrocarbons having a boiling point greater than 300° C. The integrated process, including hydrocracking and fluidized catalytic cracking, includes the steps of:

a. introducing the feedstock and hydrogen into a first hydrocracking reaction zone containing a first hydrocracking catalyst to produce a first zone effluent;

b. passing the first zone effluent and optionally additional hydrogen to a second hydrocracking reaction zone containing a second hydrocracking catalyst to produce a second zone effluent;

c. passing the second zone effluent to a fractionating zone to at least a low boiling fraction and a high boiling fraction, and optionally one or more intermediate fractions;

d. passing the bottoms fraction to a fluidized catalytic cracking reaction and separation zone operating under conditions that promote formation of olefins and gasoline and that minimize olefin-consuming reactions;

e. recovering olefins from the fluidized catalytic cracking reaction and separation zone;

f. recovering gasoline from the fluidized catalytic cracking reaction and separation zone;

g. conveying at least a portion of remaining cycle oil from the fluidized catalytic cracking reaction and separation zone to the first and/or second hydrocracking reaction zone.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The invention will be described in further detail below and with reference to the attached drawings all of which describe or relate to apparatus, systems and methods of the present invention. For the purpose of illustrating the invention, there are shown in the drawings embodiments which are presently preferred, with optional unit operations, inlets, outlets and/or streams shown in dashed lines. In the figures, which are not intended to be drawn to scale, each similar component that is illustrated in various figures is represented by a like numeral. In the figures:

FIG. 2 is a generalized diagram of a downflow fluidized catalytic cracking reactor system; and FIG. 3 is a generalized diagram of a riser fluidized catalytic cracking reactor system.

DETAILED DESCRIPTION OF THE INVENTION

Figure 1:
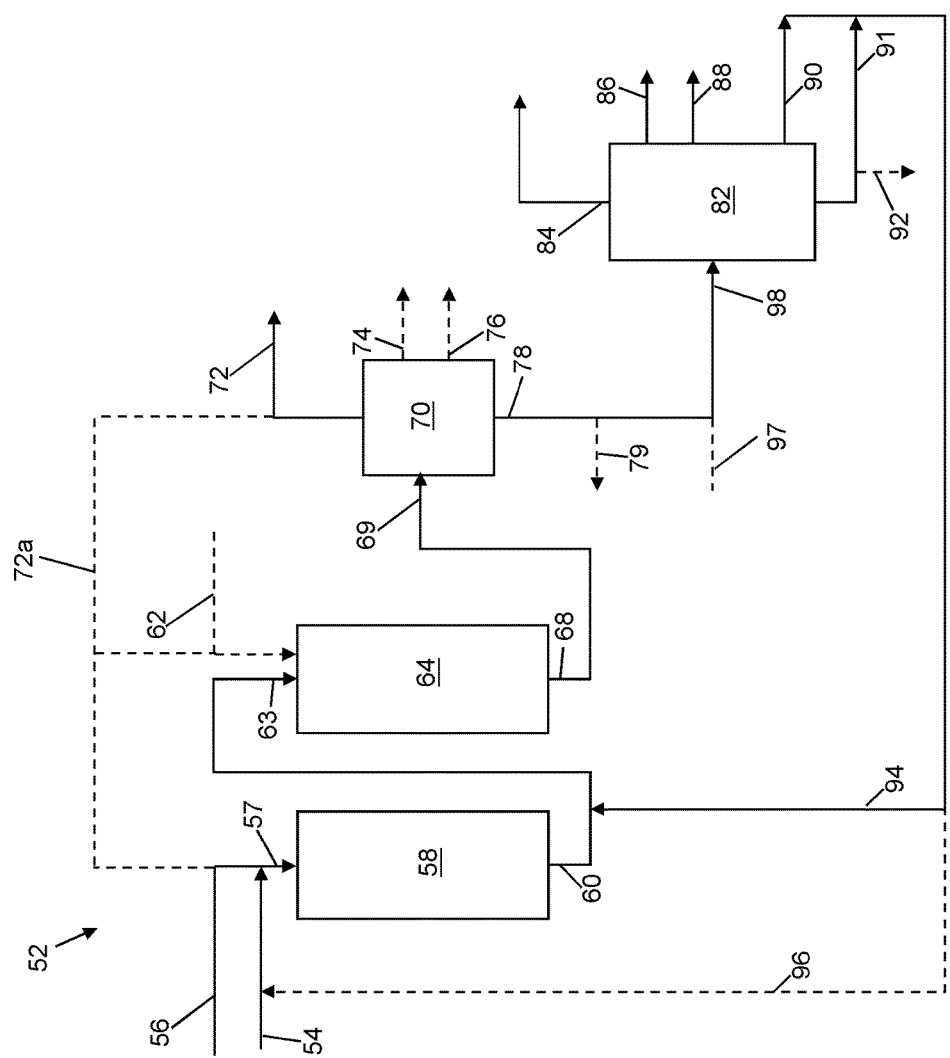
FIG. 1 is a process flow diagram of an integrated hydrocracking and fluidized catalytic cracking system described herein.

Integrated processes and apparatus are provided for the refining and hydrocracking hydrocarbon feeds, such as vacuum gas oil, to obtain improved yields and higher quality products, including light olefins propylene and butylenes, and middle distillate products. Typically, a hydrocracking unit does not produce light olefins, and conventional or high severity FCC processes do not produce mid distillates suitable for use as transportation fuel. However, the integrated processes and apparatus provided herein produces both light olefins and middle distillate products while minimizing production of side products, as all or most unconverted bottoms are processed within the battery limits of the integrated unit. According to the present processes and apparatus, the FCC process bottoms (e.g., boiling at 370° C. and above) are recycled to the first and/or second stage of the hydrocracking reaction zone for hydrogenation and further cracking, which improves the overall yield of middle distillates, i.e., from both the FCC reaction and separation zone, and from the hydrocracking product fractionator.

Importantly, by integrating hydrocracking and FCC operations, a level of flexibility is attained that is not possible by the individual, non-integrated processes. For instance, in operations in which the hydrocracking unit conversion is relatively high, e.g., 80 V %, due to factors including but not limited to reactor selection, catalyst type, extent of catalytic activity reduction, operating conditions and the particular characteristics of the feedstock, there will be less feedstock to the FCC unit and as a result the integrated unit will produce more naphtha and diesel product and less light olefins such as propylene. On the other hand, in operations in which the hydrocracking unit conversion is relatively low level, e.g., 60 V %, there will be a relative increase in feedstock to the FCC unit thereby resulting in a relatively higher level of olefinic product. Table 1 shows exemplary volume percentage yields for olefin, naphtha and middle distillate products relative to the conversion level in the hydrocracking unit. Notably, the olefin yield can range from as high as about 19 V % when the hydrocracker conversion is only 20 V % to 0 V % when the hydrocracker conversion is 100 V %, wherein the volume percentages are based on the volume of initial feed.

TABLE 1

| Hydrocracker Conversion | FCC Feed* | Olefin Yield | Naphtha Yield | Middle Distillate Yield |
|---|---|---|---|---|
| 20 | 80 | 19.2 | 7.17 | 12.06 |
| 30 | 70 | 16.8 | 10.76 | 18.09 |
| 40 | 60 | 14.4 | 14.34 | 24.11 |
| 50 | 50 | 12 | 17.93 | 30.14 |
| 60 | 40 | 9.6 | 21.51 | 36.17 |
| 70 | 30 | 7.2 | 25.10 | 42.20 |
| 80 | 20 | 4.8 | 28.69 | 48.23 |
| 90 | 10 | 2.4 | 32.27 | 54.26 |
| 100 | 0 | 0 | 35.86 | 60.29 |

*The FCC feed values are approximate and based on the hydrocracking conversion level. The values may be slightly higher or lower due to the composition of gas feed and quantities of hydrogen incorporated in the hydrocracker.

In general, the process and apparatus for improved cracking include a first hydrocracking reaction zone in which the feedstock is hydrotreated (i.e., hydrodesulfurized, hydrodenitrognized, hydrogenated) and cracked in the presence of hydrogen. Effluents from the first hydrocracking reaction zone, containing cracked hydrocarbons yielded from the first hydrocracking reaction zone, partially cracked hydrocarbons and unconverted hydrocarbons, and optionally additional hydrogen, are passed to a second hydrocracking reaction zone. Effluents from the second hydrocracking reaction zone are fractionated to produce at least a low boiling fraction and a high boiling (bottoms) fraction, and optionally one or more intermediate fractions. Fractionator bottoms including unconverted hydrocarbons and any cracked hydrocarbons and/or partially cracked hydrocarbons boiling above a predetermined fluidized catalytic cracking feed cut point are passed to a fluidized catalytic cracking (FCC) reaction and separation zone. The FCC charge is cracked, and the FCC effluent is separated in into light olefins and gasoline that result from the cracking reactions, and heavier components including unconverted hydrocarbons and partially cracked hydrocarbons, e.g., cycle oils. The heavier components are further hydrogenated and cracked in the first and/or second hydrocracking reaction zone.

In particular, and referring to FIG. 1, a process flow diagram of an integrated hydrocracking and FCC apparatus 52 is provided. Apparatus 52 includes a first hydrocracking reaction zone 58 containing a first hydrocracking catalyst, a second hydrocracking reaction zone 64 containing a second hydrocracking catalyst, a fractionating zone 70 and an FCC reaction and separation zone 82.

First hydrocracking reaction zone 58 includes a feed inlet 57 for receiving feedstock and hydrogen gas. Inlet 57 is in fluid communication with a source of feedstock via a conduit 54 and a source of hydrogen via a conduit 56. In additional embodiments a first hydrocracking reaction zone can include a separate feedstock inlet and one or more separate hydrogen inlets.

In the first hydrocracking reaction zone 58, an intermediate product is produced including gases, naphtha, middle distillates and higher boiling hydrocarbons, including partially cracked hydrocarbons and unconverted hydrocarbons. The intermediate product is discharged via a first hydrocracking reaction zone outlet 60 and is conveyed to second hydrocracking reaction zone 64.

Second hydrocracking reaction zone 64 includes an inlet 63 for receiving the intermediate product and optionally additional hydrogen. Inlet 63 is in fluid communication with the first hydrocracking reaction zone outlet 60 and an optional source of hydrogen via a conduit 62. In additional embodiments the second hydrocracking reaction zone can include separate intermediate product inlet and one or more separate hydrogen inlets. Note that the source of hydrogen can be the same source as that feeds first hydrocracking reaction zone 58, or a separate source. For instance, in certain systems, it can be desirable to provide hydrogen of different purity levels and/or hydrogen partial pressure to first hydrocracking reaction zone 58 and second hydrocracking reaction zone 64.

Effluent discharged from second hydrocracking reaction zone 64 via an outlet 68 includes gases, naphtha, middle distillates and higher boiling hydrocarbons, including partially cracked and unconverted hydrocarbons, which is conveyed to an inlet 69 of fractionating zone 70.

In one embodiment, the charge is fractioned into overhead gas, e.g., containing molecules having a boiling point below about 36° C., that is discharged via an outlet 72; optionally one or more intermediate fractions including a naphtha fraction having a boiling point in the range of about 36° C. to about 180° C. that is discharged via outlet 74 and a middle distillate fraction having a boiling point in the range of about 180° C. to about 370° C. that is discharged via outlet 76; and a bottoms fraction, e.g., having an initial boiling point of about 370° C., that is discharged via outlet 78. A portion 72a of the overhead gases, after separation and cleaning, can be recycled to first hydrocracking reaction zone 58 and/or second hydrocracking reaction zone 64.

In another embodiment, the charge is fractioned into a low boiling fraction that is discharged via outlet 72, an intermediate boiling fraction that is discharged via an outlet (which can be one of either outlet 74 or outlet 76, whereby the other outlet is not required) and a high boiling fraction that is discharged via outlet 78. The intermediate boiling fraction can be passed to downstream unit operations (not shown) for further separation or processing, e.g., into a naphtha fraction and a middle distillate fraction.

In an additional embodiment, naphtha and/or middle distillates from the fractionating zone 70 can be passed to the FCC reaction and separation zone 82 (not shown in FIG. 1), for instance, for conversion into light olefins and/or gasoline. The naphtha and/or middle distillates can be conveyed along with the high boiling fraction. Alternatively, naphtha and/or middle distillates can be conveyed separately from the high boiling fraction to different risers or downers in the FCC unit, or to separate FCC units.

In a further embodiment, the charge is fractioned into a low boiling fraction that is discharged via outlet 72 and a high boiling fraction that is discharged via outlet 78 (whereby outlets 74 and 76 are not required). The cut point for the fractionator in this embodiment can be, for instance, 370° C., in which a naphtha fraction boiling in the range of about 36° C. to about 180° C. and a middle distillate fraction boiling in the range of about 180° C. to about 370° C. are discharged along with overhead gases, and passed to downstream unit operations (not shown) for further separation or processing, including collection of naphtha and middle distillate. A portion 72a of the overhead gases, including hydrogen and light hydrocarbons such as $C_1$ to $C_4$, can be recycled to first hydrocracking reaction zone 58 and/or second hydrocracking reaction zone 64 after separation and cleaning. Further, the cut point for the fractionator in this embodiment can be lower than 370° C., whereby the high boiling fraction contains hydrocarbons boiling in the middle distillate and possibly in the naphtha range that are discharged via outlet 78.

In certain embodiments, an optional bleed outlet 79 is provided in fluid communication with the discharge stream from outlet 78 to remove heavy poly nuclear aromatic compounds, which could cause equipment fouling. The portion of the bottoms or high boiling fraction that is bled can be about 0 V % to about 10 V %, in certain embodiments about 1 V % to about 5 V % and in further embodiments about 1 V % to about 3 V %.

The bottoms fraction or high boiling fraction that is discharged via outlet 78 is conveyed to FCC reaction and separation zone 82 that operates under conditions that promote formation of olefins while minimizing olefin-consuming reactions, such as hydrogen-transfer reactions. FCC reaction and separation zone 82 generally includes one or more reaction sections in which the charge and an effective quantity of fluidized cracking catalyst are introduced. In addition, FCC reaction and separation zone 82 includes a regeneration section in which cracking catalysts that have become coked, and hence access to the active catalytic sites becomes limited or nonexistent, are subjected to high temperatures and a source of oxygen to combust the accumulated coke and steam to strip heavy oil adsorbed on the spent catalyst. Furthermore, FCC reaction and separation zone 82 includes a separation apparatus, such as a fractionating tower, to partition the FCC reaction products into olefins, gasoline and heavy products. While arrangements of certain FCC units are described herein with respect to FIGS. 2 and 3, one of ordinary skill in the art will appreciate that other well-known FCC units can be employed.

In general, FCC reaction and separation zone 82 includes a feed inlet 98 in fluid communication with the high boiling or bottoms outlet 78 of the fractionating zone 70. In additional embodiments, a source of feedstock that is separate from the feedstock introduced to first hydrocracking reaction zone 58 is optionally conveyed into FCC reaction and separation zone 82, e.g., via a conduit 97. This feedstock can be the same or different in its characteristics than the feedstock to introduced to first hydrocracking reaction zone 58. In certain embodiments, the feedstock introduced via conduit 97 is treated vacuum gas oil having low sulfur and nitrogen content. In addition, steam can be integrated with the feed 98 to atomize or disperse the feed into the FCC unit.

FCC reaction and separation zone 82 includes plural outlets for discharging products, partially cracked hydrocarbons, unreacted hydrocarbons and by-products. In particular, effluent from the FCC reactor is fractioned and discharged via a water and gas outlet 84, an olefin outlet 86, a gasoline outlet 88, a light cycle oil outlet 90 and a heavy cycle oil outlet 91. In certain embodiments, both light and heavy cycle oil can be discharged via a single outlet. Olefins and gasoline are recovered and collected as final or intermediate products, i.e., that can be subjected to further downstream separation and/or processing.

Cycle oil, including light cycle oil from FCC reaction and separation zone outlet 90 and heavy cycle oil from FCC reaction and separation zone outlet 91, are combined and passed, e.g., via a conduit 94, to second hydrocracking reaction zone 64. A bleed stream 92, which is a slurry oil stream that is heavier than the heavy cycle oil stream and typically contains catalyst particles, can also be discharged from the FCC reaction and separation zone 82. In certain optional embodiments, at least a portion of the cycle oil from FCC reaction and separation zone 82 can be recycled, e.g., via a conduit 96, and combined with the feedstock at conduit 54 and introduced to first hydrocracking reaction zone 58.

Advantageously, in the process of the present invention, middle distillate production can be about 10 V % to about 60 V %, in certain embodiments about 20 V % to about 50 V %, and in further embodiments about 30 V % to about 40 V %, based on the initial feed via inlets 57 and 97. In addition, light olefin production can be about 3 V % to about 20 V %, in certain embodiments about 5 V % to about 20 V %, and in further embodiments about 10 V % to about 20 V %, based on the initial feed via inlets 57 and 97.

The initial feedstock for use in above-described apparatus and process (i.e., introduced via conduit 54 and optionally via conduit 97) can be a partially refined oil product obtained from various sources. In general, the feedstock contains hydrocarbons having boiling point greater than about 300° C., and in certain embodiments in vacuum gas oil range of about 370° C. to about 600° C. The source of the partially refined oil feedstock can be crude oil, synthetic crude oil, bitumen, oil sand, shell oil, coal liquids, or a combination including one of the foregoing sources. For example, the partially refined oil feedstock can be vacuum gas oil, deasphalted oil and/or demetallized oil obtained from a solvent deasphalting process, light coker or heavy coker gas oil obtained from a coker process, cycle oil obtained from FCC process separate from the integrated FCC process described herein, gas oil obtained from a visbreaking process, or any combination of the foregoing partially refined oil products. In certain embodiments, vacuum gas oil is a suitable initial feedstock for the integrated cracking process.

The first hydrocracking reaction zone and the second hydrocracking reaction zone can include the same type of reactor or different types of reactors. Suitable reaction apparatus include fixed bed reactors moving bed reactor, ebullated bed reactors, baffle-equipped slurry bath reactors, stirring bath reactors, rotary tube reactors, slurry bed reactors, or other suitable reaction apparatus as will be appreciated by one of ordinary skill in the art. In certain embodiments, and in particular for vacuum gas oil and similar feedstocks, fixed bed reactors are utilized for both the first and second hydrocracking reaction zones. In additional embodiments, and in particular for heavier feedstocks and other difficult to crack feedstocks, ebullated bed reactors are utilized for both the first and second hydrocracking reaction zones.

In general, the operating conditions for the reactor in a hydrocracking reaction zone include:

reaction temperature of about 300° C. to about 500° C., in certain embodiments about 330° C. to about 475° C., and in further embodiments about 330° C. to about 450° C.;

hydrogen partial pressure of about 60 Kg/cm$^2$ to about 300 Kg/cm$^2$, in certain embodiments about 100 Kg/cm$^2$ to about 200 Kg/cm$^2$, and in further embodiments about 130 Kg/cm$^2$ to about 180 Kg/cm$^2$;

liquid hourly space velocity (LHSV) of about 0.1 h$^{-1}$ to about 10 h$^{-1}$, in certain embodiments about 0.25 h$^{-1}$ to about 5 h$^{-1}$, and in further embodiments of 0.5 h$^{-1}$ to 2 h$^{-1}$; and hydrogen/oil ratio of about 500 normalized m$^3$ per m$^3$ (Nm$^3$/m$^3$) to about 2500 Nm$^3$/m$^3$, in certain embodiments about 800 Nm$^3$/m$^3$ to about 2000 Nm$^3$/m$^3$, and in further embodiments about 1000 Nm$^3$/m$^3$ to about 1500 Nm$^3$/m$^3$.

A catalyst that is suitable for the particular charge and the desired product is maintained in the hydrocracking reactors within the zones. As is known to those having ordinary skill in the art, the catalyst can be different in the first and second zones.

In certain embodiments, the first zone hydrocracking catalyst includes any one of or combination including amorphous alumina catalysts, amorphous silica alumina catalysts, zeolite based catalyst. The first zone hydrocracking catalyst can possess an active phase material including, in certain embodiments, any one of or combination including Ni, W, Mo, or Co.

In certain embodiments in which an objective in the first hydrocracking reaction zone is hydrodenitrogenation, acidic alumina or silica alumina based catalysts loaded with Ni—Mo or Ni—W active metals, or combinations thereof, are used. Hydrodenitrogenation reactions are commonly targeted in the first hydrocracking reaction zone as second hydrocracking reaction zone catalysts can be provided that commonly not tolerant to the presence of nitrogen. Hydrodesulfurization reactions also occur at the process pressures and temperatures using these hydrodenitrogenation catalysts. A substantial amount of sulfur compounds are converted at the hydrodenitrogenation conditions. In embodiments in which the objective is to remove all nitrogen and to increase the conversion of hydrocarbons, silica alumina, zeolite or combination thereof are used as catalysts, with active metals including Ni—Mo, Ni—W or combinations thereof.

In certain embodiments, the second zone hydrocracking catalyst includes any one of or combination including zeolite based catalysts, amorphous alumina catalysts, amorphous silica alumina catalysts. In order to effectively convert refined and partially cracked feedstocks into lighter fractions, suitable catalysts include acidic catalysts such as silica alumina, zeolite or combinations thereof, with active metals including Ni—Mo, Ni—W or combinations thereof.

Catalytic cracking reactions occur in FCC reaction and separation zone 82 under conditions that promote formation of olefins and that minimize olefin-consuming reactions, such as hydrogen-transfer reactions. These conditions generally depend on the type and configuration of the FCC unit.

Various types of FCC reactors operate under conditions that promote formation of olefins and gasoline are known, including the High-Severity FCC process developed by Nippon Oil Corporation of Japan, Deep Catalytic Cracking (DCC-I and DCC-II) and Catalytic Pyrolysis Process developed by SINOPEC Research Institute of Petroleum Processing of Beijing, China, the Indmax process developed by Indian Oil Corporation of India, MAXOFIN™ developed by ExxonMobil of Irving, Tex., USA and KBR, Inc. of Houston, Tex., USA, NExCC™ developed by Fortum Corporation of Fortum, Finland, PetroFCC developed by UOP LLC of Des Plaines, Ill., USA, Selective Component Cracking developed by ABB Lummus Global, Inc. of Bloomfield, N.J., USA, High-Olefins FCC developed by Petrobras of Brazil, and Ultra Selective Cracking developed by Stone & Webster, Incorporated of Stoughton, Mass., USA.

In certain embodiments, a suitable high severity FCC unit operation includes a downflow reactor and is characterized by high reaction temperature, short contact time and high catalyst to oil ratio. A downflow reactor permits higher catalyst to oil ratio because the requirement to lift the catalyst by vaporized feed is not required. Reaction temperatures are in the range of about 550° C. to about 650° C., which is higher than conventional FCC reaction temperatures. Under these reaction temperatures, two competing cracking reactions, thermal cracking and catalytic cracking, occur. Thermal cracking contributes to the formation of lighter products, mainly dry gas and coke, while catalytic cracking increases propylene yield. Therefore, the residence time in the downflow reactor is relatively short, e.g., less than about 1 second, and in certain embodiments about 0.2-0.7 seconds, to minimize thermal cracking. Undesirable secondary reactions such as hydrogen-transfer reactions, which consume olefins, are suppressed due to the very short residence times. To maximize conversion during the short residence time, a high catalyst to oil ratio is used, e.g., greater than 20:1, and catalysts and the feedstock are admixed and dispersed at the reactor inlet and separated immediately at the reactor outlet.

In certain embodiments, an FCC unit configured with a downflow reactor is provided that operates under conditions that promote formation of olefins and that minimize olefin-consuming reactions, such as hydrogen-transfer reactions. FIG. 2 is a generalized process flow diagram of an FCC unit 100 which includes a downflow reactor and can be used in the hybrid system and process according to the present invention. FCC unit 100 includes a reactor/separator 110 having a reaction zone 114 and a separation zone 116. FCC unit 100 also includes a regeneration zone 118 for regenerating spent catalyst.

In particular, a charge 120 is introduced to the reaction zone, in certain embodiments also accompanied by steam or other suitable gas for atomization of the feed, and with an effective quantity of heated fresh or hot regenerated solid cracking catalyst particles from regeneration zone 118 is also transferred, e.g., through a downwardly directed conduit or pipe 122, commonly referred to as a transfer line or standpipe, to a withdrawal well or hopper (not shown) at the top of reaction zone 114. Hot catalyst flow is typically allowed to stabilize in order to be uniformly directed into the mix zone or feed injection portion of reaction zone 114.

The bottoms fraction from the fractionating zone serves as the charge to the FCC unit 100, alone or in combination with an additional feed as discussed above. The charge is injected into a mixing zone through feed injection nozzles typically situated proximate to the point of introduction of the regenerated catalyst into reaction zone 114. These multiple injection nozzles result in the catalyst and oil mixing thoroughly and uniformly. Once the charge contacts the hot catalyst, cracking reactions occur. The reaction vapor of hydrocarbon cracked products, unreacted feed and catalyst mixture quickly flows through the remainder of reaction zone 114 and into a rapid separation zone 116 at the bottom portion of reactor/separator 110. Cracked and uncracked hydrocarbons are directed through a conduit or pipe 124 to a conventional product recovery section known in the art.

If necessary for temperature control, a quench injection can be provided near the bottom of reaction zone 114 immediately before the separation zone 116. This quench injection quickly reduces or stops the cracking reactions and can be utilized for controlling cracking severity and allows for added process flexibility.

The reaction temperature, i.e., the outlet temperature of the downflow reactor, can be controlled by opening and closing a catalyst slide valve (not shown) that controls the flow of regenerated catalyst from regeneration zone 118 into the top of reaction zone 114. The heat required for the endothermic cracking reaction is supplied by the regenerated catalyst. By changing the flow rate of the hot regenerated catalyst, the operating severity or cracking conditions can be controlled to produce the desired yields of light olefinic hydrocarbons and gasoline.

A stripper 132 is also provided for separating oil from the catalyst, which is transferred to regeneration zone 118. The catalyst from separation zone 116 flows to the lower section of the stripper 132 that includes a catalyst stripping section into which a suitable stripping gas, such as steam, is introduced through streamline 134. The stripping section is typically provided with several baffles or structured packing (not shown) over which the downwardly flowing catalyst passes counter-currently to the flowing stripping gas. The upwardly flowing stripping gas, which is typically steam, is used to "strip" or remove any additional hydrocarbons that remain in the catalyst pores or between catalyst particles.

The stripped or spent catalyst is transported by lift forces from the combustion air stream 128 through a lift riser of the regeneration zone 118. This spent catalyst, which can also be contacted with additional combustion air, undergoes controlled combustion of any accumulated coke. Flue gases are removed from the regenerator via conduit 130. In the regenerator, the heat produced from the combustion of the by-product coke is transferred to the catalyst raising the temperature required to provide heat for the endothermic cracking reaction in the reaction zone 114.

In one embodiment, a suitable FCC unit 100 that can be integrated into the system of FIG. 1 that promotes formation of olefins and that minimizes olefin-consuming reactions includes a high severity FCC reactor, can be similar to those described in U.S. Pat. No. 6,656,346, and US Patent Publication Number 2002/0195373, both of which are incorporated herein by reference. Important properties of downflow reactors include introduction of feed at the top of the reactor with downward flow, shorter residence time as compared to riser reactors, and high catalyst to oil ratio, e.g., in the range of about 20:1 to about 30:1.

In general, the operating conditions for the reactor of a suitable downflow FCC unit include:

reaction temperature of about 550° C. to about 650° C., in certain embodiments about 580° C. to about 630° C., and in further embodiments about 590° C. to about 620° C.;

reaction pressure of about 1 Kg/cm$^2$ to about 20 Kg/cm$^2$, in certain embodiments of about 1 Kg/cm$^2$ to about 10 Kg/cm$^2$, in further embodiments of about 1 Kg/cm$^2$ to about 3 Kg/cm$^2$;

contact time (in the reactor) of about 0.1 seconds to about 30 seconds, in certain embodiments about 0.1 seconds to about 10 seconds, and in further embodiments about 0.2 seconds to about 0.7 seconds; and a catalyst to feed ratio of about 1:1 to about 40:1, in certain embodiments about 1:1 to about 30:1, and in further embodiments about 10:1 to about 30:1.

In certain embodiments, an FCC unit configured with a riser reactor is provided that operates under conditions that promote formation of olefins and that minimizes olefin-consuming reactions, such as hydrogen-transfer reactions. FIG. 3 is a generalized process flow diagram of an FCC unit 200 which includes a riser reactor and can be used in the hybrid system and process according to the present invention. FCC unit 200 includes a reactor/separator 210 having a riser portion 212, a reaction zone 214 and a separation zone 216. FCC unit 200 also includes a regeneration vessel 218 for regenerating spent catalyst.

Hydrocarbon feedstock is conveyed via a conduit 220, and in certain embodiments also accompanied by steam or other suitable gas for atomization of the feed, for admixture and intimate contact with an effective quantity of heated fresh or regenerated solid cracking catalyst particles which are conveyed via a conduit 222 from regeneration vessel 218. The feed mixture and the cracking catalyst are contacted under conditions to form a suspension that is introduced into the riser 212.

In a continuous process, the mixture of cracking catalyst and hydrocarbon feedstock proceed upward through the riser 212 into reaction zone 214. In riser 212 and reaction zone 214, the hot cracking catalyst particles catalytically crack relatively large hydrocarbon molecules by carbon-carbon bond cleavage.

During the reaction, as is conventional in FCC operations, the cracking catalysts become coked and hence access to the active catalytic sites is limited or nonexistent. Reaction products are separated from the coked catalyst using any suitable configuration known in FCC units, generally referred to as the separation zone 216 in FCC unit 200, for instance, located at the top of the reactor 210 above the reaction zone 214. The separation zone can include any suitable apparatus known to those of ordinary skill in the art such as, for example, cyclones. The reaction product is withdrawn through conduit 224.

Catalyst particles containing coke deposits from fluid cracking of the hydrocarbon feedstock pass from the separation zone 214 through a conduit 226 to regeneration zone 218. In regeneration zone 218, the coked catalyst comes into contact with a stream of oxygen-containing gas, e.g., pure oxygen or air, which enters regeneration zone 218 via a conduit 228. The regeneration zone 218 is operated in a configuration and under conditions that are known in typical FCC operations. For instance, regeneration zone 218 can operate as a fluidized bed to produce regeneration off-gas comprising combustion products which is discharged through a conduit 230. The hot regenerated catalyst is transferred from regeneration zone 218 through conduit 222 to the bottom portion of the riser 212 for admixture with the hydrocarbon feedstock and noted above.

In one embodiment, a suitable FCC unit 200 that can be integrated into the system of FIG. 1 that promotes formation of olefins and that minimizes olefin-consuming reactions includes a high severity FCC reactor, can be similar to that described in U.S. Pat. Nos. 7,312,370, 6,538,169, and 5,326,465.

In an alternative embodiment, liquid products from fractionating zone 70, including the bottoms fraction, the middle distillate fraction and the naphtha fraction, can be separately introduced into one or more separate riser reactors of an FCC unit having multiple risers. For instance, the bottoms fraction can be introduced via a main riser, and a stream of naphtha and/or middle distillates can be introduced via a secondary riser. In this manner, olefin production can be maximized while minimizing the formation methane and ethane, since different operating conditions can be employed in each riser.

In general, the operating conditions for the reactor of a suitable riser FCC unit include:

reaction temperature of about 480° C. to about 650° C., in certain embodiments about 500° C. to about 620° C., and in further embodiments about 500° C. to about 600° C.;

reaction pressure of about 1 Kg/cm$^2$ to about 20 Kg/cm$^2$, in certain embodiments of about 1 Kg/cm$^2$ to about 10 Kg/cm$^2$, in further embodiments of about 1 Kg/cm$^2$ to about 3 Kg/cm$^2$;

contact time (in the reactor) of about 0.7 seconds to about 10 seconds, in certain embodiments of about 1 seconds to about 5 seconds, in further embodiments of about 1 seconds to about 2 seconds; and a catalyst to feed ratio of about 1:1 to about 15:1, in certain embodiments of about 1:1 to about 10:1, in further embodiments of about 8:1 to about 20:1.

A catalyst that is suitable for the particular charge and the desired product is conveyed to the FCC reactor within the FCC reaction and separation zone. In certain embodiments, to promote formation of olefins and minimize olefin-consuming reactions, such as hydrogen-transfer reactions, an FCC catalyst mixture is used in the FCC reaction and separation zone, including an FCC base catalyst and an FCC catalyst additive.

In particular, a matrix of a base cracking catalyst can include one or more clays such as kaolin, montmorilonite, halloysite and bentonite, and/or one or more inorganic porous oxides such as alumina, silica, boria, chromia, magnesia, zirconia, titania and silica-alumina. The base cracking catalyst preferably has a bulk density of 0.5 g/ml to 1.0 g/ml, an average particle diameter of 50 microns to 90 microns, a surface area of 50 m$^2$/g to 350 m$^2$/g and a pore volume of 0.05 ml/g to 0.5 ml/g.

A suitable catalyst mixture contains, in addition to a base cracking catalyst, an additive containing a shape-selective zeolite. The shape selective zeolite referred to herein means a zeolite whose pore diameter is smaller than that of Y-type zeolite, so that hydrocarbons with only limited shape can enter the zeolite through its pores. Suitable shape-selective zeolite components include ZSM-5 zeolite, zeolite omega, SAPO-5 zeolite, SAPO-11 zeolite, SAPO34 zeolite, and pentasil-type aluminosilicates. The content of the shape-selective zeolite in the additive is generally in the range of 20 to 70 wt %, and preferably in the range of 30 to 60 wt %.

The additive preferably has a bulk density of 0.5 g/ml to 1.0 g/ml, an average particle diameter of 50 microns to 90 microns, a surface area of 10 m$^2$/g to 200 m$^2$/g and a pore volume of 0.01 ml/g to 0.3 ml/g.

A percentage of the base cracking catalyst in the catalyst mixture can be in the range of 60 to 95 wt % and a percentage of the additive in the catalyst mixture is in a range of 5 to 40 wt %. If the percentage of the base cracking catalyst is lower than 60 wt % or the percentage of additive is higher than 40 wt %, high light-fraction olefin yield cannot be obtained, because of low conversions of the feed oil. If the percentage of the base cracking catalyst is higher than 95 wt %, or the percentage of the additive is lower than 5 wt %, high light-fraction olefin yield cannot be obtained, while high conversion of the feed oil can be achieved. For the purpose of this simplified schematic illustration and description, the numerous valves, temperature sensors, electronic controllers and the like that are customarily employed and well known to those of ordinary skill in the art of fluid catalyst cracking are not included. Accompanying components that are in conventional hydrocracking units such as, for example, bleed streams, spent catalyst discharge sub-systems, and catalyst replacement sub-systems are also not shown. Further, accompanying components that are in conventional FCC systems such as, for example, air supplies, catalyst hoppers and flue gas handling are not shown.

In some embodiments, the apparatus and/or individual unit operations of the apparatus can include a controller to monitor and adjust the product slate as desired. A controller can direct any of the parameters within the apparatus depending upon the desired operating conditions, which may, for example, be based on customer demand and/or market value. A controller can adjust or regulate valves, feeders or pumps associated with one or more unit operations based upon one or more signals generated by operator data input and/or automatically retrieved data.

In one embodiment, a controller can be in electronic communication with, and adjust, valves, feeders and/or pumps associated with the effluent from fractionator 70 to direct a quantity of one or more intermediate fractions (e.g., middle distillate via outlet 76 and/or naphtha via outlet 74) to the FCC reaction and separation unit, rather than passing them on to respective product pools, if the desired product slate includes an increase in olefin production at the sacrifice of these one or more intermediate fractions.

In another embodiment, a controller can be in electronic communication with, and adjust, thermostats, pressure regulators, valves, feeders and/or pumps associated with the first hydrocracking reaction zone 58 and/or the second hydrocracking reaction zone 64 to adjust the residence time, hydrogen feed rate, operating temperature, operating pressure, or other variables to modify the hydrocracker conversion efficiency.

The system and controller of one or more embodiments of the integrated hydrocracking and FCC apparatus provide a versatile unit having multiple modes of operation, which can respond to multiple inputs to increase the flexibility of the recovered product. The controller can be implemented using one or more computer systems which can be, for example, a general-purpose computer. Alternatively, the computer system can include specially-programmed, special-purpose hardware, for example, an application-specific integrated circuit (ASIC) or controllers intended for a particular unit operation within a refinery.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the system. For example, the memory can be used for storing historical data relating to the parameters over a period of time, as well as operating data. Software, including programming code that implements embodiments of the invention, can be stored on a computer readable and/or writeable nonvolatile recording medium, and then typically copied into memory wherein it can then be executed by one or more processors. Such programming code can be written in any of a plurality of programming languages or combinations thereof.

Components of the computer system can be coupled by one or more interconnection mechanisms, which can include one or more busses, e.g., between components that are integrated within a same device, and/or a network, e.g., between components that reside on separate discrete devices. The interconnection mechanism typically enables communications, e.g., data, instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system can contain one or more interfaces that can connect the computer system to a communication network, in addition or as an alternative to the network that can be formed by one or more of the components of the system.

According to one or more embodiments of the integrated cracking apparatus, the one or more input devices can include sensors and/or flow meters for measuring any one or more parameters of the apparatus and/or unit operations thereof. Alternatively, one or more of the sensors, flow meters, pumps, or other components of the apparatus can be connected to a communication network that is operatively coupled to the computer system. Any one or more of the above can be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms can be affected by utilizing any suitable technique including but not limited to those utilizing wireless protocols.

Although the computer system is described by way of example as one type of computer system upon which various aspects of the integrated cracking apparatus can be practiced, it should be appreciated that the invention is not limited to being implemented in software, or on the computer system as exemplarily shown. Indeed, rather than implemented on, for example, a general purpose computer system, the controller, or components or subsections thereof, can alternatively be implemented as a dedicated system or as a dedicated programmable logic controller (PLC) or in a distributed control system. Further, it should be appreciated that one or more features or aspects of the integrated cracking apparatus can be implemented in software, hardware or firmware, or any combination thereof. For example, one or more segments of an algorithm executable by a controller can be performed in separate computers, which in turn, can be in communication through one or more networks.

In some embodiments, one or more sensors and/or flow meters can be included at locations throughout the integrated cracking apparatus, which are in communication with a manual operator or an automated control system to implement a suitable process modification in a programmable logic controlled integrated cracking apparatus. In one embodiment, an integrated cracking apparatus described herein includes a controller which can be any suitable programmed or dedicated computer system, PLC, or distributed control system. The flow rates of certain product streams from the fractionator 70 and the FCC reaction and separation zone 82 can be measured, and flow can be redirected as necessary to meet the requisite product slate.

In certain embodiments, under control of an operator or a controller as described herein, the integrated cracking apparatus can operate with reduced efficiency catalyst in the first or second hydrocracking reaction zones 58, 64 to favor bottoms production. i.e., having a level of activity that is conventionally considered unsuitable for use in their respective operations. In this manner, the quantity of feed to the FCC reaction and separation zone 82 is increased, thereby resulting in an increase in its products olefins and/or gasoline via outlets 86 and/or 88.

In further embodiments, under control of an operator or a controller as described herein, either or both of the first and second hydrocracking zones 58, 64 can operate with a level of hydrogen feed that is relatively low, i.e., at a level that is conventionally considered unsuitable for use in their respective operations. In this manner, the expense of hydrogen is reduced, while the quantity of feed to the FCC reaction and separation zone 82 is increased, thereby resulting in an increase in its products olefins and/or gasoline via outlets 86 and/or 88.

Factors that can result in various adjustments or controls include customer demand of the various hydrocarbon products, market value of the various hydrocarbon products, feedstock properties such as API gravity or heteroatom content, and product quality (e.g., gasoline and mid distillate indicative properties such as octane number for gasoline and cetane number for mid distillates).

EXAMPLE

A feedstock containing demetallized oil and light and heavy vacuum gas oil fractions was hydrocracked in a series flow hydrocracking unit. The feedstock blend was characterized by a density of 889.5 Kg/L, 2.32 W % of sulfur, 886 ppmw of nitrogen, 12.1 W % of hydrogen and 1.2 W % of Micro carbon residue. The initial boiling point was 216° C.; 5 W %, 337° C.; 10 W %, 371° C.; 30 W %, 432° C.; 50 W %, 469° C.; 70 W %, 510° C., 90 W %, 585° C.; 95 W %, 632° C.; and the final boiling point was 721° C. A silica-alumina based catalyst was used in the first hydrocracking reaction zone. The operating conditions for the first stage were: 115 bars of hydrogen partial pressure, a temperature of 385° C., a liquid hourly space velocity of 0.27 h$^{-1}$, and a hydrogen to oil ratio of 1263:1. The operating conditions for the second stage were: 115 bars of hydrogen partial pressure, a temperature of 370° C., a liquid hourly space velocity of 0.80 h$^{-1}$, and a hydrogen to oil ratio of 1263:1. The overall conversion for material boiling above 375° C. was 70 W %. A USY zeolite catalyst was used in the second hydrocracking reaction zone.

The hydrocracking reaction zone effluent stream was separated and the unconverted hydrocracker bottoms stream (30 W %) having an initial boiling point of 370° C. was then sent to a high severity FCC unit with a downer reactor. A base catalyst of H-USY type zeolite with low acid site density (75 V %) and an additive, 10 W % commercial ZSM-5 (25 V %) was used in the high severity FCC unit. The base catalyst and additive were deactivated with 100% steam at 810° C. for 6 hours before evaluation in a fluid-bed steamer. The catalyst to oil ratio (mass:mass) was 30:1. The downer temperature was 630° C. 95 W % of the hydrocracker bottoms were converted in the high severity FCC unit.

The overall conversion was 100 V % and the yields are summarized in Table 2 below.

TABLE 2

| | Yield | |
|---|---|---|
| | W % | V % |
| $H_2S$ | 2.6 | |
| $NH_3$ | 0.1 | |
| $CO + CO_2$ | 0.0 | |
| $H_2, C_1, C_2$ | 2.2 | |
| $C_2$ | 0.3 | |
| $C_2=$ | 1.2 | |
| $C_3$-$C_4$ | 2.1 | |
| $C_3=$ | 7.5 | |
| $C_4$ | 1.7 | |
| $C_4=$ | 7.1 | |
| Naphtha | 25.1 | 31.1 |
| Middle Distillate | 42.2 | 45.9 |
| Gasoline | 9.5 | 9.9 |
| Coke | 0.2 | |
| Total Yield* | 102.0 | |
| Total Liquid Yield | 76.8 | 86.9 |

*Note
that the yield in excess of 100% is due to the addition of hydrogen in the hydrocracking unit.

Light and heavy cycle oils, which is around 5% were recycled back to the hydrocracker to obtain full conversion. The process yielded 42.2 W % of mid distillate and 7.5 W % of propylene, with no residue. The total gasoline production is estimated to be 32.0 W %, which includes the gasoline produced high severity FCC unit and the naphtha produced from the hydrocracker after downstream reformer processing to increase the research octane number from a value of about 80 to about 95 for use as gasoline (which slightly decreases the overall yield as is conventionally known).

The method and system of the present invention have been described above and in the attached drawings; however, modifications will be apparent to those of ordinary skill in the art and the scope of protection for the invention is to be defined by the claims that follow.

We claim:

1. An integrated cracking apparatus comprising:
 a first hydrocracking reaction zone
  containing a first hydrocracking catalyst, and including
   a feed inlet in fluid communication with a source of feedstock and a source of hydrogen and
   a first zone outlet;
 a second hydrocracking reaction zone
  containing a second hydrocracking catalyst, and including
   at least one inlet in fluid communication with first zone outlet of the first hydrocracking reaction zone and a source of hydrogen gas, and
   a second zone outlet;
 a fractionating zone including
  an inlet in fluid communication with the second zone outlet,
  an overhead gas outlet,
  a bottoms outlet, and
  optionally one or more intermediate fraction outlets;
 a fluidized catalytic cracking reaction and separation zone operating under conditions that promote formation of olefins and gasoline and that minimize olefin-consuming reactions, the fluidized catalytic cracking reaction and separation zone including at least one inlet in fluid communication with the bottoms outlet of the fractionating zone,
an olefin outlet,
a gasoline outlet, and
at least one cycle oil outlet in fluid communication with the inlet of the second hydrocracking reaction zone;
at least one flow meter constructed and arranged to measure production at the olefins outlet of the fluidized catalytic cracking reaction and separation zone; and
a controller in electronic communication with the flow meter programmed to instruct performance of an adjustment based on the measured production,
wherein the adjustment instructed by the controller is one or more of
operating with reduced efficiency catalyst in the first or second hydrocracking reaction zones to favor bottoms production and increase the quantity of feed to the fluidized catalytic cracking reactor thereby resulting in an increase in its products olefins and/or gasoline; or
operating with a level of hydrogen feed in the first or second hydrocracking reaction zones, wherein the level of hydrogen feed is relatively low to reduce the expense of hydrogen and increase the quantity of feed to the to the fluidized catalytic cracking reactor thereby resulting in an increase in its products olefins and/or gasoline.

2. This apparatus of claim 1, wherein the at least one cycle oil outlet is also in fluid communication with the feed inlet of the first hydrocracking reaction zone.

3. The apparatus of claim 1, further comprising a bleed outlet in fluid communication with the bottoms outlet of the fractionating zone.

4. The apparatus of claim 1, wherein the inlet of the fluidized catalytic cracking reaction and separation zone is in fluid communication with a source of feedstock that is separate from the bottoms outlet of the fractionating zone.

5. The apparatus of claim 1, wherein the fluidized catalytic cracking reaction and separation zone includes a down-flow reactor.

6. The apparatus of claim 1, wherein the fluidized catalytic cracking reaction and separation zone includes a riser reactor.

* * * * *